(12) United States Patent
Franke

(10) Patent No.: US 11,684,205 B2
(45) Date of Patent: Jun. 27, 2023

(54) METHOD FOR TRANSMITTING A DATA SET FROM AN OPERATING DEVICE TO A DRINKS PREPARATION MACHINE

(71) Applicant: Tchibo GmbH, Hamburg (DE)

(72) Inventor: Dominik Franke, Brüttisellen (CH)

(73) Assignee: TCHIBO GMBH, Hamburg (DE)

( * ) Notice: Subject to any disclaimer, the term of this patent is extended or adjusted under 35 U.S.C. 154(b) by 847 days.

(21) Appl. No.: 16/607,151

(22) PCT Filed: Apr. 26, 2018

(86) PCT No.: PCT/EP2018/060742
§ 371 (c)(1),
(2) Date: Oct. 22, 2019

(87) PCT Pub. No.: WO2018/197617
PCT Pub. Date: Nov. 1, 2018

(65) Prior Publication Data
US 2020/0383516 A1    Dec. 10, 2020

(30) Foreign Application Priority Data

Apr. 27, 2017 (EP) .................................... 17168414

(51) Int. Cl.
*A47J 31/52* (2006.01)
*A47J 31/40* (2006.01)
*A47J 31/44* (2006.01)

(52) U.S. Cl.
CPC .......... *A47J 31/521* (2018.08); *A47J 31/407* (2013.01); *A47J 31/4492* (2013.01)

(58) Field of Classification Search
CPC ........ G07F 9/001; G07F 13/065; A47J 31/521
See application file for complete search history.

(56) References Cited

U.S. PATENT DOCUMENTS

| 6,584,309 B1 * | 6/2003 | Whigham | ............... | G07F 9/001 |
| | | | | 705/16 |
| 10,226,148 B2 * | 3/2019 | Roth | ....................... | A47J 31/40 |
| 2015/0039776 A1 * | 2/2015 | Jarnagin, III | ........... | G07F 9/001 |
| | | | | 709/228 |

(Continued)

FOREIGN PATENT DOCUMENTS

| CN | 2015162787 | 4/2016 |
| DE | 600 12 984 | 8/2005 |

(Continued)

*Primary Examiner* — Timothy R Waggoner
(74) *Attorney, Agent, or Firm* — Rankin, Hill & Clark LLP

(57) ABSTRACT

A method for transmitting a data set from an operating device to a drinks preparation machine includes by the operating device: registering an input or a selection, which specifies the data set; by the drinks preparation machine, triggered by the user: transmitting a machine address of the drinks preparation machine to the operating device (4); by the operating device: receiving the machine address and transmitting the data set and the machine address to a coordination server; by the coordination server: storing the machine address and, assigned thereto, the data set; by the coordination server: transmitting this data set to the drinks preparation machine; by the drinks preparation machine: storing the data set and/or executing an action according to the data set.

16 Claims, 2 Drawing Sheets

(56) References Cited

U.S. PATENT DOCUMENTS

| | | | | |
|---|---|---|---|---|
| 2015/0351581 A1* | 12/2015 | Li | ............... | A47J 31/5251 |
| | | | | 700/275 |
| 2017/0099981 A1* | 4/2017 | Haidar | ............... | B67D 1/0888 |
| 2017/0360250 A1* | 12/2017 | Spencer | ............... | A47J 31/04 |
| 2018/0325307 A1* | 11/2018 | Stasch | ............... | A47J 31/521 |
| 2019/0259077 A1* | 8/2019 | Cuppari | ............... | G07F 13/00 |
| 2020/0031656 A1* | 1/2020 | Rudick | ............... | G06F 3/013 |

FOREIGN PATENT DOCUMENTS

| | | |
|---|---|---|
| EP | 3167775 | 5/2017 |
| EP | 3168815 | 5/2017 |
| JP | 2002-352307 | 12/2002 |
| JP | 2006-018469 | 1/2006 |
| JP | 2014-170283 | 9/2014 |
| JP | 2015-133678 | 7/2015 |
| JP | 2016-537892 | 12/2016 |
| WO | 2009/032929 | 3/2009 |
| WO | 2017/058794 | 4/2017 |

\* cited by examiner

METHOD FOR TRANSMITTING A DATA SET FROM AN OPERATING DEVICE TO A DRINKS PREPARATION MACHINE

BACKGROUND OF THE INVENTION

Field of the Invention

The invention relates to drinks preparation machines for preparing drinks or the like. According to embodiments, the preparation is effected from a portion package with a portion packaging (for example a capsule) and with an extraction material (for example, coffee) which is contained in the portion packaging. In particular, it concerns a method for transmitting a data set, for example a user recipe, from an operating device to a drinks preparation machine, and corresponding (partial) methods for operating an operating device, of a drinks preparation machine and of a coordination server.

Description of Related Art

Drinks preparation machines for preparing drinks or the like from an extraction material that is present in a portion package are known, for example, as coffee machines or espresso machines. In many corresponding systems, the portion packaging is designed as capsules, in which the extraction material is sealed, for example in an airtight manner. For extraction, the capsule is placed in a capsule receiver and is pierced, for example at two sides, which are opposite to one another. An extraction fluid—generally hot water—is then introduced at the first side. The extraction product is discharged from the capsule at the second side. This takes place in a so-called brewing module.

Apart from a brewing module, one or more further units for delivering and adding a further drinks component such as, for example, milk can be present. The drinks preparation machine can therefore produce a drink or generally speaking a total product from two part-products.

The European patent application No. 15 194 735 describes a method for operating a drinks preparation machine for producing a product from several part-products, wherein quantity shares of the part-products can be adjusted on a graphic display of the quantity shares by a user.

The European patent application No. 15 194 667 describes a method for operating a drinks preparation machine including using preparation parameters that are determined on the basis of a portion code of a portion package. Herein, the individual preparation parameters are adjustable by a user.

In the aforementioned patent applications, amongst other things, the option of a communication of the drinks preparation machine with an operating device is described, the operating device being able to be mobile and portable, for example a mobile telephone or smartphone. User recipes can the transmitted to the drinks preparation machine, or preparation prescripts that are stored in the drinks preparation machine can be modified, by the operating device. A user recipe is a quantity of adjustable preparation parameters that define or modify a preparation prescript. One envisages the preparation being triggered by an operating step, which is carried out at the drinks preparation machine by the user himself.

On transmitting data sets in general and in particular user recipes, it should be ensured that the user or the operating device are authorised to carry out a transmission. This can be effected, for example, by way of a code being exchanged between the drinks preparation machine and the operating device prior to this, or by way of these being integrated into a common radio network (WLAN). For this however, it is necessary, for example, for a pairing method to be carried out or for a password for connection to the radio network to be communicated to the user. This can be disadvantageous or undesirable.

A possible object of the invention is to realise an operation of the drinks preparation machine that is comfortable for the user, in particular with regard to the transmission of a data set, in particular of a user recipe, to the drinks preparation machine, and to provide a corresponding method for transmitting a data set, in particular a user recipe, from an operating device to a drinks preparation machine, and corresponding (partial) methods for operating an operating device, of a drinks preparation machine and of a coordination server that permits this realisation.

A further possible object of the invention is to simplify the operation of a drinks preparation machine for a user.

A further possible object of the invention is to provide an alternative possibility for transmitting a data set, in particular a user recipe, from an operating device to a drinks preparation machine.

These objects are achieved by a method for transmitting a data set from an operating device to a drinks preparation machine, and corresponding (partial) methods for operating an operating device, of a drinks preparation machine and of a coordination server, as well as by a computer program and a drinks preparation machine.

The method for transmitting a data set from an operating device to a drinks preparation machine hence includes at least the following steps:

- by the operating device: registering an input or a selection, which specifies the data set;
- by the operating device: registering a selection of an operating mode for indirectly sending a data set to the drinks preparation machine, in particular as a selection amongst several operating modes by a user of the operating device;
- by the drinks preparation machine: registering a control command that is triggered by the user;
- by the drinks preparation machine, triggered by the control command:
- transmitting a machine address of the drinks preparation machine to the operating device;
- by the operating device: receiving the machine address;
- by the operating device: transmitting the data set and the machine address to a coordination server:
- by the coordination server: receiving the machine address and the data set:
- by the coordination server: storing the machine address and, assigned thereto, the data set;
- by the coordination server: transmitting this data set to the drinks preparation machine, in particular including using the machine address;
- by the drinks preparation machine: receiving the data set from the coordination server;
- by the drinks preparation machine: storing the data set and/or executing an action according to the data set.

Herewith, it is possible to transmit a data set to any "foreign" drinks preparation machine. This, for example, is such a drinks preparation machine, concerning which the operating device is not registered, or which conversely is not registered in the operating device. A direct transmission of a data set via a direct communication connection between the operating device and the drinks preparation machine is not necessary. Such a direct communication connection does not therefore need to be set up too.

In embodiments, the data set defines a user recipe. Herein, a user recipe includes a quantity of adjustable preparation parameters that define or modify a preparation prescript for producing a total product by the drinks preparation machine.

In embodiments, the action that is carried out by the drinks preparation machine is the production of a total product according to the user recipe.

In embodiments, the production of the total product is effected including using a portion package.

In embodiments, the following steps are carried out for transmitting the data set to the drinks preparation machine by the coordination server:
- by the drinks preparation machine: notifying the coordination server, including transmission of the machine address to the coordination sever, that the drinks preparation machine is ready for receiving a data set;
- by the coordination server: receiving the notification;
- by the coordination server: if or as soon as a data set which is assigned to the machine address is stored in the coordination server, transmitting this data set to the drinks preparation machine.

The transmission of the data set to the drinks preparation machine can be effected immediately if the data set is already stored in the coordination server at the point in time of the receiving of the notification. Otherwise, the coordination server can wait until the data set has been obtained from the operating device, and then transmit this to the drinks preparation machine, without necessarily having to send a new notification or request.

The transmission of the data set to the drinks preparation machine including using a machine address can be effected by way of the machine address identifying the drinks preparation machine that is assigned to it and the transmission to the drinks preparation machine that is identified in this manner taking place.

The notification of the receiving readiness by the drinks preparation machine can also be considered as an enquiry to the coordination server as to whether a data set, which is assigned to the machine address, is stored herein. Typically, a network address is transmitted with the notification of the receiving readiness.

According to these embodiments therefore, the drinks preparation machine therefore itself carries out the notification of the coordination server in an active manner. According to these embodiments, it is never the case that information is sent to the drinks preparation machine in an active manner, thus without notification or enquiry or request or triggering by the drinks preparation machine. The drinks preparation machine is protected better from unauthorised access by way of this.

In other embodiments, the data set is ("actively") transmitted from the coordination server to the drinks preparation machine, without this carrying out a notification or enquiry or contacting the coordination server. This, for example, is effected after the machine address and the data set have been received by the coordination server. A network address, by way of which information can be transmitted to the drinks preparation machine, can be stored in the coordination server in a manner assigned to the machine address, in order to be able to send the data set to the drinks preparation machine in this manner. This network address can, for example, be an IP address or an e-mail address. Such a network address can also be transmitted together with the machine address from the drinks preparation machine to the operating device, and then transmitted from the operating device to the coordination server. The following steps are then carried out for transmitting the data set to the drinks preparation machine by the coordination server:
- by the coordination server: determining the network address which is assigned to the received machine address;
- by the coordination server: transmitting the data set to this network address.

The transmission of the data set can only be initiated and possibly repeated by the coordination server after a pre-defined time interval—for example a few seconds—after receiving the data set.

The drinks preparation machine typically includes a communication unit that is designed for the wireless communication and by way of which the drinks preparation machine can communicate with the coordination server.

The machine address permits an unambiguous identification of the machine. For example, it is a serial number, a device name, an e-mail address, a (static) network address (e.g., IP address) or a hardware address (e.g., MAC address).

The step of the storing of the data step and/or of the executing of an action according to the data step—for example the production of a total product according to the user recipe—typically includes a confirmation step, in which the user must carry out a confirmation action at the drinks preparation machine, for example by way of pressing a button. By way of this, one can prevent an action or a preparation being effected without for example a receptacle for receiving the total product being present.

In embodiments, the method includes the step:
- by the operating device: displaying a user instruction, which requests the user to input a control command at the drinks preparation machine.

Herewith, it is possible to trigger the continued execution of the method at the drinks preparation machine, without the operating unit itself communicating directly with the drinks preparation machine. The input of the control command can be effected, for example, by way of twice actuating an operating button of the drinks preparation machine.

In embodiments, the input of the control command is effected by an interaction of the user directly with the drinks preparation machine, thus without using the operating device.

In embodiments, the drinks preparation machine does not transmit the machine address if it does not register a corresponding control command, which has been triggered at the drinks preparation machine by the user himself, in particular by an interaction of the user with the drinks preparation machine in a direct manner, thus without using the operating device.

In embodiments, the transmission of the machine address of the drinks preparation machine to the operating device is effected via a communication that only acts in the near range. Herewith, it is possible to practically rule out any influence by other devices. This communication runs via a direct channel between the drinks preparation machine and the operating device.

In embodiments, the transmission of the machine address of the drinks preparation machine to the operating device is effected by way of a mono-directional transmission.

In embodiments, the transmission of the machine address of the drinks preparation machine to the operating device is effected via an optical communication channel. Herewith, it is possible to apply existing elements of an operating unit of the drinks preparation machine.

In embodiments, this transmission is effected via an acoustic communication channel or a radio connection, in particular via a radio connection that is effective in the near range, for example NFC, Bluetooth, etc.

In embodiments, the communication via the optical communication channel includes the following steps:
- by the drinks preparation machine: representing a character string on a display of the drinks preparation machine and registering a manual input of this code at the operating unit.

Herewith, it is possible to realise the transmission without any special scanning software on the operating device.

In embodiments, the communication via the optical communication channel includes the steps:
- by the drinks preparation machine: sending an optical code;
- by the operating device: optically registering and decoding this optical code;
- wherein in particular the optical code is represented by a spatial or temporal variation of emitted light. Herewith, it is possible to use known optical codes, for whose recognition standard software can be used.

The optical code can encode the transmitted information in the form of spatial and/or temporal variations of a display on the output unit. A spatial variation or coding is effected for example by way of displaying a one-dimensional or two-dimensional barcode ("QR-code"). A temporal variation is effected, for example, by way of changing the brightness of parts of a display or of the complete display or by way of modulating a light emission of a light diode or of another light source, typically in the visible or infrared region.

In other embodiments, the transmission of the machine address to the operating device is effected according to a near range radio protocol. In particular, this can only be operated in a mono-directional manner. The near range radio protocol can be, for example, Bluetooth, NFC or another protocol.

A mono-directional operation or a mono-directional transmission means that one communication partner (here the drinks preparation machine) only sends, and the other (here the operating device) only receives. This applies to optical communication as well as radio-based communication.

In embodiments, the method, after receiving the data set, as a further step includes:
- by the drinks preparation machine: displaying the data set.

Herewith, it is possible for the user to control his transmitted recipe before triggering the production.

In embodiments, the method as a further step includes:
- by the coordination server: after completion of a time interval ("storage time interval") after storing the data set, deleting the stored data set and its assignment to the machine address.

Herewith, one prevents the data sets, which are no longer used, from taking up memory space.

The data set can also be deleted in the coordination server after it is been transmitted to the drinks preparation machine. The oldest data set can be deleted if a predefined number of data sets for a machine address is exceeded.

In embodiments, the method as further steps includes:
- by the operating device: receiving a device name that identifies the drinks preparation machine, wherein in particular
  - either the device name is transmitted to the operating device from the drinks preparation machine, in particular together with the transmission of the machine address to the operating device;
  - or the device name is transmitted to the operating device from the coordination server, in particular after receiving the machine address from the operating device;
- by the operating device: displaying the device name for the selection by the user, before the later sending of a further data set for the renewed production of a total product.

Herewith, after the machine address has been transmitted once, it is possible to select the drinks preparation machine at the operating device on the basis of the device name and to transmit the data set, without the machine address having to be transmitted once again to the operating device.

In embodiments, the method as further steps includes:
- by the operating device: transmitting, together with the data set and the machine address, an operating device identifier to the coordination server;
- by the coordination server: storing the operating device identifier including assignment to the machine address.

Herewith, it is possible to differentiate data sets that originate from different operating devices from one another and to possibly prioritise them.

The operating device includes an input device and an output device that can be combined as a touchscreen, as well as a data processing unit. It can include a communication unit for the communication with the drinks preparation machine, the communication unit however according to the present invention not necessarily being used for the bidirectional communication with the drinks preparation machine, and in particular not for the direct transmission of a data set to the drinks preparation machine. The operating device can be a mobile, in particular portable device such as a mobile telephone or smartphone, or a device that is functionally equal thereto, such as a smart watch or a wearable computer.

The method for the operating the operating device—in interaction with the drinks preparation machine and the coordination server—serves for the transmission of a data set from the operating device to the drinks preparation machine. The method includes at least the following steps, which are carried out on the operating device:
- registering an input or a selection, which specifies the data set;
- registering a selection of an operating mode for indirectly sending the data set to a drinks preparation machine;
- receiving a machine address;
- transmitting the data set and the machine address to a coordination server.

The computer program for operating an operating device—in interaction with the drinks preparation machine and the coordination server—serves for the transmission of a data set from the operating device to a drinks preparation machine. On execution on the operating device, the computer program carries out the steps, which are described above, in the method for operating the operating device.

The computer program for execution on the operating device can be loaded into an internal memory of a digital data processing unit of the operating device and includes computer program code means which, when they are carried out in the digital data processing unit of the operating device, bring this to carry out the steps of the aforedescribed method, which are envisaged for the operating device. A computer program product includes a data carrier or a computer-readable medium, on which the computer program code means are stored.

The method for operating a drinks preparation machine—in interaction with the operating device and the coordination server—serves for the transmission of a data set from the operating device to the drinks preparation machine. The method includes at least the following steps, which are carried out on the drinks preparation machine:

registering a control command, which is triggered by a user;

triggered by the control command: transmitting a machine address of the drinks preparation machine to the operating device;

optionally: notification of a coordination server, including transmission of the machine address to the coordination server, that the drinks preparation machine is ready for receiving a data set;

receiving a data set from the coordination server;

storing the data set and/or carrying out an action according to the data set.

The drinks preparation machine is designed for carrying out the aforedescribed method.

The method for operating a coordination server—in interaction with the operating device and the drinks preparation machine—serves for transmitting a data set from the operating device to the drinks preparation machine. The method includes at least the following steps, which are carried out on the coordination server:

by the coordination server: receiving a machine address of a drinks preparation machine and a data set;

by the coordination server: storing the machine address and, assigned thereto, the data set;

by the coordination server: transmitting this data set to a drinks preparation machine according to the machine address.

In embodiments, the following steps are carried out for transmitting a data set to the drinks preparation machine by the coordination server:

by the coordination sever: receiving a notification, including specifying a machine address, that a drinks preparation machine is ready for receiving a data set;

by the coordination server: if a data set, which is assigned to the machine address, is stored in the coordination server, transmitting this data set to a sender of the notification.

BRIEF DESCRIPTION OF THE DRAWINGS

The subject-matter of the invention is hereinafter explained in more detail by way of preferred embodiment examples, which are represented in the accompanying drawings. In each case in a schematic manner are shown in.

DETAILED DESCRIPTION OF THE INVENTION

Figure 1:
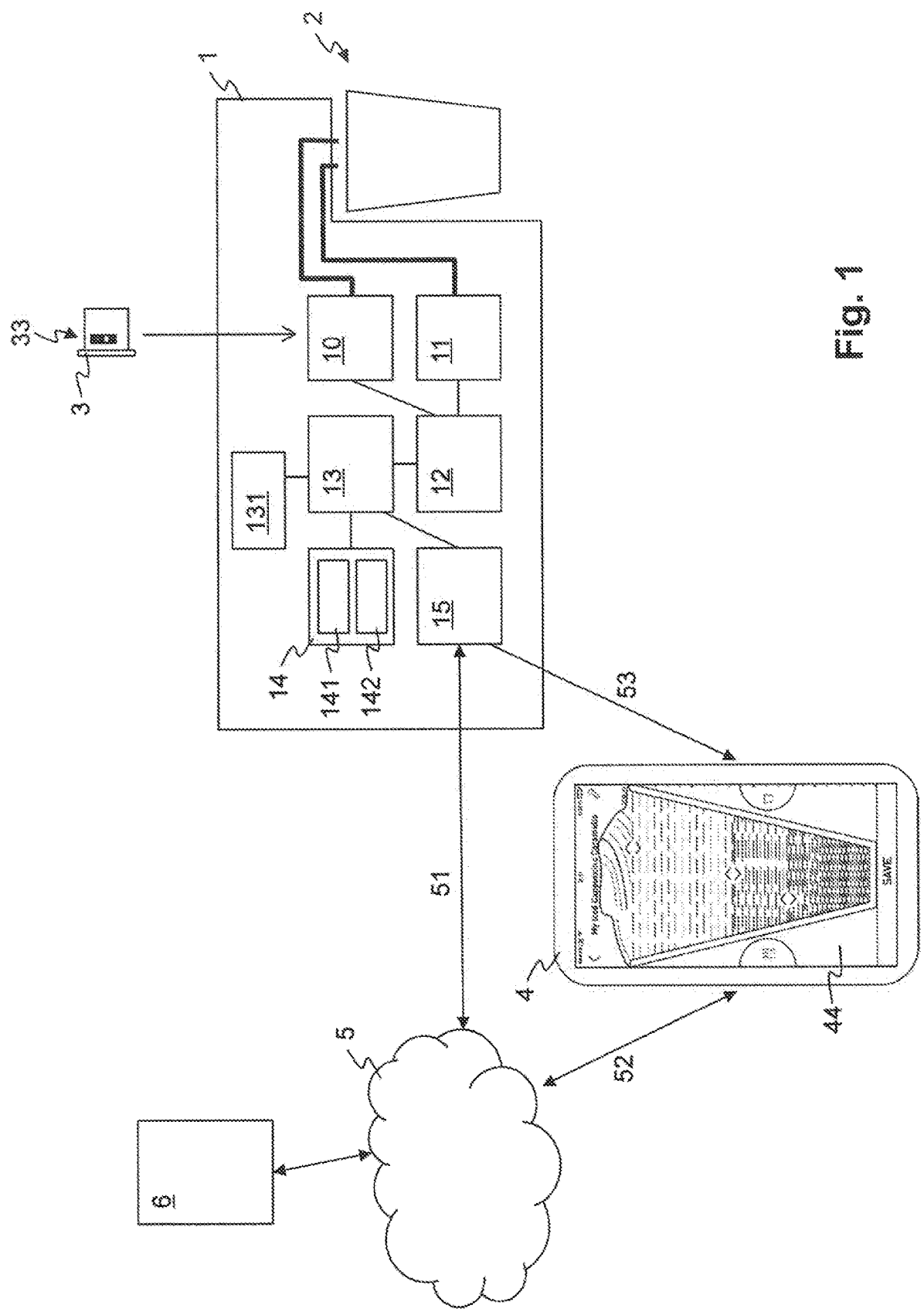
FIG. 1 a system for drinks preparation.

Basically, in the figures the same elements are provided with the same reference numerals.

FIG. 1 shows a system for drinks preparation with a drinks preparation machine 1 for filling a receptacle 2 with at least one extraction material from a portion package 3. The drinks preparation machine 1 can be connected to a first communication network such as an intranet or the internet via a first communication connection 51. An operating device 4, which can be mobile and portable, for example a mobile telephone or smartphone, or a dedicated device that is only provided for operating the drinks preparation machine 1, can communicate with the drinks preparation machine 1 in an indirect manner via a second communication connection 52 and the communication network 5 or optionally also in a direct manner via a direct channel 53, wherein a direct bidirectional connection is not necessary according to the present invention.

The drinks preparation machine 1 and the operating device 4 each communicate with a coordination server 6 via the communication network 5.

The drinks preparation machine 1 includes a base unit 10 for extracting an extraction product by way of an extraction unit. The drinks preparation machine 1, for example, is a portion capsule coffee machine of the type known per se, wherein the base unit 10 is a brewing module and the extraction fluid is hot water that is under pressure. The extraction unit is fed to the container 2.

The portion package 3 includes a portion packaging (for example a capsule) and an extraction material (for example coffee), which is contained in the portion packaging. The portion package 3 can be provided with a machine-readable portion code 33.

The drinks preparation machine 1 include a supplementary unit 11 that can deliver or produce at least one further product or part-product, for example milk and/or milk froth, which are likewise fed to the receptacle 2.

The extraction product and the at least one part-product are fed to the receptacle 2 in a simultaneous or sequential manner and together form a total product in the receptacle 2, for example a "caffe macchiato" consisting of coffee, cold or warm milk, and cold or warm milk froth.

For the control of the base unit 10 and the supplementary unit 11, for the operation by the user and for the optional communication with other devices, the drinks preparation machine 1 includes a control unit 2, a superordinate control unit 13, an operating unit 14 and a communication unit 15.

The control unit 12 is configured for control of the base unit 10 and the supplementary unit 11, for example by way of it controlling pumps, valves, heating elements, etc., of these units and registering and processing measured values of temperatures, pressures, flow, etc.

The superordinate control unit 13 is configured for control of the operating unit 14 and the communication unit 15. The superordinate control unit 13 can be realised in a manner in which it is separated from the control unit physically and/or with regard to program technology or can be identical to the control unit 12.

The operating unit 14 includes an input unit 141, for example with switches, buttons and/or a jog dial or adjusting wheel and/or a touch-sensitive surface, as well as an output unit 142 with optical display means such as lights or a screen, etc., and/or acoustic display means such as a loudspeaker, summer, etc.

The communication unit 15 is configured for communication via the first communication connection 51, which can be wireless (for example, by way of Wi-Fi, Bluetooth, etc.) or wire-connected (for example, by way of Ethernet, USB), in particular for communication with the communication network 5.

An operating device 4, typically a mobile telephone or smartphone includes a user interface 44, for example a touch-sensitive screen or touchscreen, which functions as an input and output unit. Additionally or alternatively, buttons (keys) of the operating device 4 can also serve as input units. A speech input can be realised additionally or alternatively to this.

Where not otherwise mentioned, information can be outputted to the user and inputs of the user can be inputted, via the operating unit 14 and/or the operating device 4.

The superordinate control unit 13 includes a memory 131, in which, amongst other things, preparation prescripts or recipes are stored. A preparation prescript includes at least control information that can be converted into commands for the control of the base unit 10 and of the supplementary unit 11. Such control information on the one hand includes sequence information that specifies a sequence of steps that are to be carried out by the base unit 10 and/or supplementary unit 11 for producing a total product. On the other hand, the control information includes, for example, temperatures, volume details, time details, absolute or relative quantity shares, further parameters of part-products, sequence of the preparation of part-products, name of a drink, name of a user, preparation hints and preparation recommendations, capsule preference, etc.,—hereinafter generally also called preparation parameters—which parameterise a sequence.

A preparation prescript can also include user instructions. These instructions are part of the preparation of the total product and must be carried out by a user. For this, the user instructions can be displayed by way of the output unit 142 or the user interface 44 of the operating device 4. For example, such user instructions are "now add ice cubes".

User instructions that are not part of a preparation prescript but relate to the operation of the drinks preparation machine and/or of the operating device 4 in another manner can also be displayed. In particular, a user instruction can request a user to trigger the indirect transmission of a user recipe from an arbitrary operating device 4, at the drinks preparation machine 1.

For preparing a product, control information or corresponding commands are implemented by the base unit 10 and the supplementary unit 11 according to the preparation prescript and a preparation sequence is realised by this. If the preparation prescript includes user instructions, then these are displayed to the user at corresponding locations of the sequence.

A preparation prescript can include preparation parameters that are permitted to be adjusted by the user, as well as preparation parameters that cannot be adjusted by the user. Adjustable preparation parameters, for example, are (volume) shares of part-products in the total product, a total quantity or the temperature of a part-product. For adjustable preparation parameters, the preparation prescript can include a standard value or default value, which is used if the user does not adjust the parameter.

For adjusting adjustable preparation parameters, a selection of one or more such preparation parameters is displayed to the user on the user interface 44 of the operating device 4 and an input of the user for adjusting the preparation parameter is registered. A user recipe is defined herewith, as a quantity of adjustable preparation parameters that define a preparation prescript or supplement and/or modify a stored preparation prescript.

The operating unit 4 can transmit information, which represents the registered user inputs such as quantity shares, selection of the container or the total quantity, temperature selection, etc., to the drinks preparation machine 1:
  in a direct manner via a direct channel 53, if configured for this,
  or indirectly via the second communication connection 52 and the first communication connection 51.

Further below, it is described how the indirect transmission can be realised, so that one can avoid the setting up of a communication connection via the direct channel 53 for the transmission of information from the operating device 4 to the drinks preparation machine 1.

Figure 2:
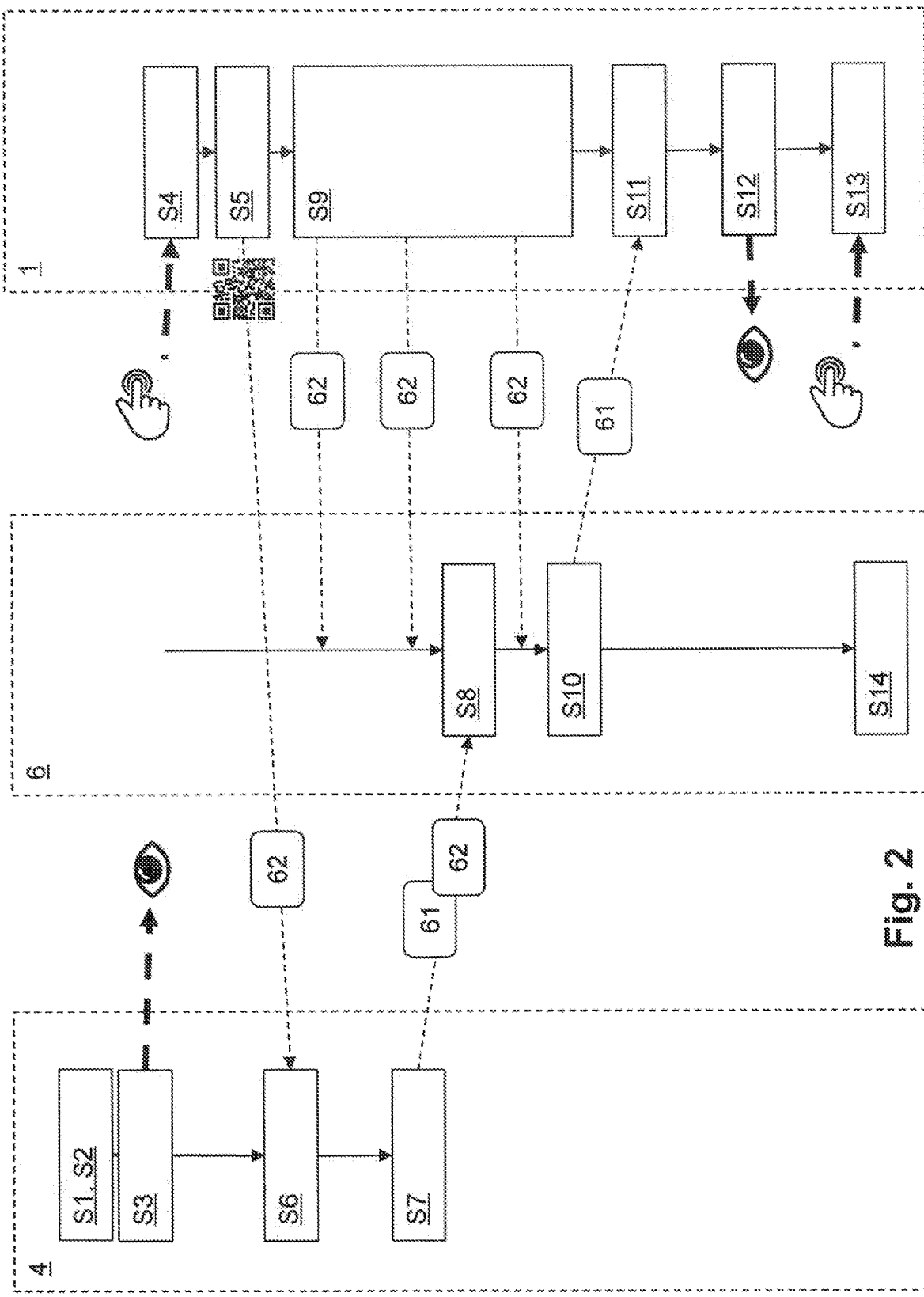
FIG. 2 a flow diagram of a method for transmitting a user recipe.

FIG. 2 shows a flow diagram of a sequence of a method for transmitting a data set, in particular a user recipe 61, from an operating device 4 to a drinks preparation machine 1. The method is explained by way of the transmission of a user recipe 61, but is also generally applicable to a data set. A data set, for example, can also specify basic settings of the drinks preparation machine 1, or other parameters that do not directly describe the production of a product.

The method includes the following steps (each indicated by S1, S2, etc.):
  S1: by a user at an operating device 4: inputting or selecting of a user recipe 61.
  S2: by the user on the operation device 4: selecting an operating mode for indirectly sending the user recipe 61 to a drinks preparation machine 1. In particular, this is effected as a selection amongst several operating modes. Such other operating modes are, for example, the direct transmission of a recipe to a (another) drinks preparation machine, or a configuration of a (another) drinks preparation machine, the drinks preparation machines being configured for the direction communication with the operating device.
  S3: optionally: by the operating device 4: displaying a user instruction.
  S4: by the user at the drinks preparation machine 1: inputting a control command or registering a control command which is triggered by the user. The control command can be made known to the user, for example, by way of an operating instruction in printed or electronic form, or by way of the user instruction, which is optionally displayed at the operating device 4.
  S5: by the drinks preparation machine 1, triggered by the control command, transmitting a machine address 62 to the operating device 4. This can be effected via a communication that only acts in the near range, in particular via a communication that acts over a distance of less than two metres, less than one metre or less than 50 cm. In embodiments, this communication is mono-directional. For example, it includes the display of an optical code such as a QR code on a display of the output unit 142 of the drinks preparation machine 1 during a time interval ("display time interval").
  S6: by the operating device 4: receiving the machine address 62. Optionally, it can be examined as to whether the machine address 62 is a valid one.
  S7: by the operating device 4: transmitting the user recipe 61 and the machine address 62 to a coordination server 6.
  S8: by the coordination server 6: receiving and storing the machine address 62 and, assigned thereto, the user recipe 61. Deleting the oldest user recipe 61 if more than a predefined maximum (for example, five) of user recipes 61 are stored for this machine address 62.
  S9: by the drinks preparation machine 1: notifying the coordination server 6, including transmission of the machine address 62 to the coordination server 6, that the drinks preparation machine 1 is ready for receiving a user recipe 61. This can also be considered as an enquiry as to whether a user recipe 61, which is assigned to the machine address, is stored. Repeating the enquiry, if this is not the case. An interval for repetition is, for example, two or five or ten seconds or half a minute or more. The possibly repeated enquiring begins, for example, on transmitting the machine address 62 to the operating device 4. In particular, if this transmission is mono-directional and the drinks preparation machine 1 does not obtain a receipt confirmation directly from the operating device 4 the possibly repeated enquiring can be automatically ended after completion of a time interval ("enquiry time interval"). The enquiry time interval is typically at least as equally long or somewhat longer (for example, two minutes) than the display time interval. Alternatively, one can make do without the repetition of the request. The coordination server 6 is a then configured to automatically transmit the user recipe 61 to the drinks preparation machine 1 as soon as it is present, and without waiting for a renewed notification or enquiry of the drinks preparation machine 1.

S10: if the user recipe 61 is present, by way of the coordination server 6: transmitting the user recipe 61 to the drinks preparation machine 1.

S11: by the drinks preparation machine 1: receiving the user recipe 61.

S12: optionally: by the drinks preparation machine 1: displaying the received user recipe 61.

S13: by the drinks preparation machine 1: executing an action, in particular producing the total product according to the user recipe 61. The production can optionally demand an input of the user for triggering or confirmation.

S14: optionally: by the coordination server 6: after transmitting the user recipe 61 to the drinks preparation machine 1, or, if no transmission has taken place, after the completion of a time interval ("storage time interval") after the storing of the user recipe 61: deleting the stored user recipe 61 and its assignment to the machine address 62. The time interval is, for example, five minutes.

If several user recipes 61 with the same assigned machine address 62 are transmitted to the coordination server 6, the coordination server 6 can be configured such that it only stores the lastly transmitted one. Alternatively, the coordination server 6 can store several user recipes 61 and transmit these to the drinks preparation machine 1 on enquiry by this. The drinks preparation machine 1 can thereupon provide the user with a selection of the several user recipes 61.

In embodiments, the operating device 4 together with the user recipe 61 and the machine address 62 can also transmit an operating device identifier to the coordination server 6. The operating device identifier unambiguously identifies the operating device 4. It is, for example, an alphanumerical code that is unambiguously assigned to the operating device 4. It can be stored in the coordination server 6 including an assignment to the machine address 62.

In embodiments, a device name, which identifies the drinks preparation machine 1, is transmitted to the operating device 4. This is effected, for example, together with the transmission of the machine address 62 to the operating device 4. It is alternatively effected by way of the coordination server 6, after receiving the machine address 62 from the operating device 4, transmitting the device name in a response to the operating device 4. For this, the device name is stored in the coordination server 6 in a manner assigned to the machine address. The device name is typically a description of the drinks preparation machine 1, which is understandable to the user, for example a detail of its location ("Room 1303" or "Hotel Lobby" or "Peter's machine"). The device name and its assignment is defined on configuring the drinks preparation machine 1 and is stored in the drinks preparation machine 1 and/or coordination server 6.

Due to the operating device 4 knowing the device name, this can be displayed in an understandable form at the operating device 4 and be provided for selection to the user for the renewed sending of a user recipe 61 or for the renewed production of a total product. Alternatively, the machine address 62 can also be displayed and provided for selection to the drinks preparation machine 1. In both cases, the operating device 4 can carry out the transmission of the user recipe 61 and of the machine address 62 (and possibly of the user name) to the coordination server 6 according to the selection, without the machine address 62 having to be transmitted once again to the operating device 4 prior to this.

In order to herein prevent the operating device 4 transmitting user recipes 61 of the drinks preparation machine 1 despite the fact that the user has not been located in the region of the drinks preparation machine 1 for some time, the method can be configured to prevent such transmissions after a certain time interval ("use time interval"). This time interval can be one or more hours or days or even longer. It can begin with the transmission of the machine address 62 to the operating device 4. An examination as to whether the time interval for the operating device 4 has lapsed can take place in the coordination server 6.

In order to herein prevent user recipes 61 from being able to be transmitted to the drinks preparation machine 1 from several operating devices 4, user recipes 61 can only be accepted by that user device 4, whose operating device identifier has been assigned last of all (in the coordination server 6) to the machine address 62 (and the assignment has been stored).

The communication between the operating device 4 and the coordination server 6 as well as between the drinks preparation machine 1 and the coordination server 6 is effected via known communication systems and communication protocols, for example TCP/IP. For this, network addresses or URLs, under which the coordination server 6 can be reached, can be stored in the operating device 4 and the drinks preparation machine 1.

Generally, it is the case that the different transmissions of information between the operating device 4, the coordination server 6 and the drinks preparation machine 1 can be effected via a public communication network 5 such as the internet, including using different communication methods with or without the use of cryptographic methods.

The invention claimed is:

1. A method for transmitting a data set defining a user recipe from an operating device to a drinks preparation machine, wherein the user recipe comprises a set of adjustable preparation parameters which define or modify a preparation prescript for producing a total product by the drinks preparation machine, wherein the transmitting of the data set is accomplished without setting up a direct communication connection between the operating device and the drinks preparation machine, and wherein the method comprises at least the following steps:
by the operating device: registering an input or a selection, which specifies the data set;
by the operating device: registering a selection of an operating mode for indirectly sending the data set to a drinks preparation machine;
by the drinks preparation machine: registering a control command which is triggered by the user by an interaction of the user directly with the drinks preparation machine;
by the drinks preparation machine, triggered by the control command: transmitting a machine address of the drinks preparation machine to the operating device;
by the operating device: receiving the machine address;

by the operating device: transmitting the data set and the machine address to a coordination server;

by the coordination server: receiving the machine address and the data set;

by the coordination server: storing the machine address and, assigned thereto, the data set;

by the coordination server: transmitting this data set to the drinks preparation machine, including using the machine address;

by the drinks preparation machine: receiving the data set from the coordination server;

by the drinks preparation machine executing an action according to the data set, wherein the action which is executed by the drinks preparation machine is the production of the total product according to the user recipe.

2. The method according to claim 1, wherein the following steps are carried out for transmitting the data set to the drinks preparation machine by the coordination server:

by the drinks preparation machine: notification of the coordination server, including transmission of the machine address to the coordination server, that the drinks preparation machine is ready for receiving a data set;

by the coordination server: receiving the notification;

by the coordination server: if or as soon as a data set which is assigned to the machine address is stored in the coordination server, transmitting this data set to the drinks preparation machine.

3. The method according to claim 1, comprising the further step of:

by the operating device: displaying a user instruction that requests the user to input control commands at the drinks preparation machine.

4. The method according to claim 1, wherein the transmission of the machine address of the drinks preparation machine to the operating device is effected via a communication which only acts in the near range.

5. The method according to claim 1, wherein the transmission of the machine address of the drinks preparation machine to the operating device is effected via an optical communication channel.

6. The method according to claim 5, wherein the communication via the optical communication channel comprises the further step of:

by the drinks preparation machine: representing a character string on a display of the drinks preparation machine and registering a manual input of this code at the operating device.

7. The method according to claim 5, wherein the communication via the optical communication channel comprises the further steps of:

by the drinks preparation machine: sending an optical code;

by the operating device: optically registering and decoding this optical code.

8. The method according to claim 7, wherein the optical code is represented by a spatial or temporal variation of emitted light.

9. The method according to claim 1, wherein the selection is a selection, by a user of the operating device (4), amongst several operating modes.

10. The method according to claim 1, wherein the method, after receiving the data set, comprises as a further step:

by the drinks preparation machine: displaying the data set.

11. The method according to claim 1, wherein the method as a further step comprises:

by the coordination server: after completion of a time interval ("storage time interval") after storing the data set, deleting the stored data set and its assignment to the machine address.

12. The method according to claim 1, wherein the method comprises as further steps:

by the operating device: receiving a device name which identifies the drinks preparation machine, by the operating device: displaying the device name for the selection by the user, before the later sending of a further data set.

13. The method according to claim 12, wherein either the device name is transmitted to the operating device by the drinks preparation machine together with the transmission of the machine address to the operating device, or the device name is transmitted to the operating device by the coordination server after receiving the machine address from the operating device.

14. The method according to claim 1, wherein the method comprises as further steps:

by the operating device: transmitting, together with the data set and the machine address, an operating device identifier to the coordination server;

by the coordination server: storing the operating device identifier including an assignment to the machine address.

15. A method for operating a drinks preparation machine for transmitting a data set defining a user recipe from the operating device to the drinks preparation machine to effect the production of a total product according to the user recipe by the drinks preparation machine, wherein the user recipe comprises a set of adjustable preparation parameters which define or modify a preparation prescript for producing the total product by the drinks preparation machine, wherein the transmitting of the data set is accomplished without setting up a direct communication connection between the operating device and the drinks preparation machine, and wherein the method comprises at least the following steps which are carried out on the drinks preparation machine:

registering a control command, which is triggered by a user by an interaction of the user directly with the drinks preparation machine;

triggered by the control command: transmitting a machine address of the drinks preparation machine to the operating device;

optionally: notification of a coordination server, including transmission of the machine address to the coordination server, that the drinks preparation machine is ready for receiving a data set;

receiving a data set from the coordination server, transmitted to the drinks preparation machine including using the machine address;

storing the data set and/or carrying out an action according to the data set, wherein the action which is carried out by the drinks preparation machine is the production of a total product according to the user recipe.

16. A drinks preparation machine, designed for carrying out the method according to claim 15.

* * * * *